United States Patent [19]

Brown et al.

[11] Patent Number: 5,178,479
[45] Date of Patent: Jan. 12, 1993

[54] ROD END CLIP

[75] Inventors: John J. Brown, Chicago; Brian R. Peek, Mokena, both of Ill.

[73] Assignee: Illinois Tool Works Inc., Glenview, Ill.

[21] Appl. No.: 542,751

[22] Filed: Jun. 25, 1990

[51] Int. Cl.$^5$ ............................................. F16C 11/00
[52] U.S. Cl. .................................... 403/13; 403/71; 403/406.1; 248/74.2
[58] Field of Search .............. 403/71, 69, 13, 70, 403/405.1, 409.1, 406.1, 407.1, 374; 248/74.2

[56] References Cited

U.S. PATENT DOCUMENTS

| | | | |
|---|---|---|---|
| 3,679,249 | 7/1972 | Hoffmann | 403/69 |
| 3,695,652 | 10/1972 | Ratnikas | 403/69 |
| 3,993,410 | 11/1976 | Lindsay, Jr. | 403/71 X |
| 4,306,820 | 12/1981 | Nelson | 403/71 X |
| 4,406,557 | 9/1983 | Suzuki et al. | 403/406.1 X |
| 4,482,265 | 11/1984 | Koza | 403/71 |
| 4,591,285 | 5/1986 | Nelson | 403/71 X |
| 4,840,334 | 6/1989 | Kikuchi | 248/74.2 X |

FOREIGN PATENT DOCUMENTS 2848260 5/1979 Fed. Rep. of Germany ........ 403/71

Primary Examiner—Peter M. Cuomo
Attorney, Agent, or Firm—Schwartz & Weinrieb

[57] ABSTRACT

A rod end clip for retaining an elongated L-shaped actuating rod, terminating in a short substantially right angled end portion, in a connected state with respect to an apertured lever member includes a rear wall section upstanding from a base member and having its distal end terminating in an overlying arm portion. A rigid retaining wall member upstanding from the base member and disposed substantially opposite the rear wall section is provided so as to form a retaining groove therebetween for securely retaining the actuating rod therein against rotational and vertical movement. The rigid retaining wall member has a cam surface which permits the insertion of the long leg of the actuating rod into the retaining groove with a low insertion force.

20 Claims, 2 Drawing Sheets

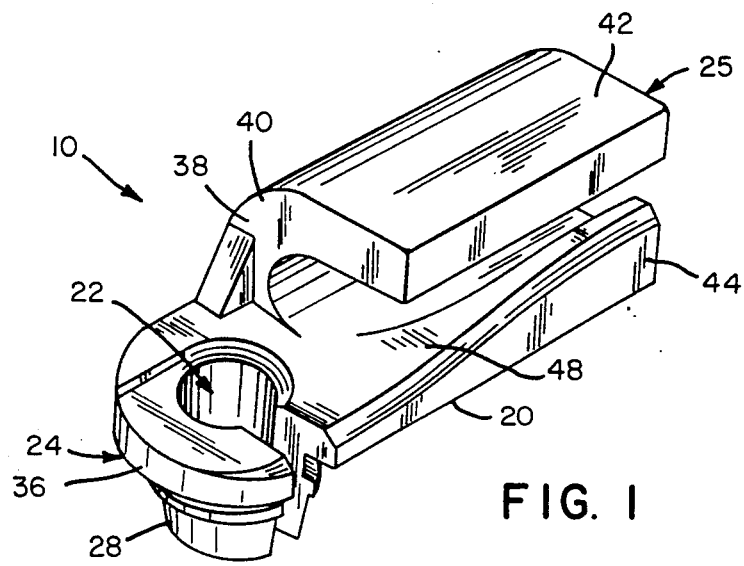
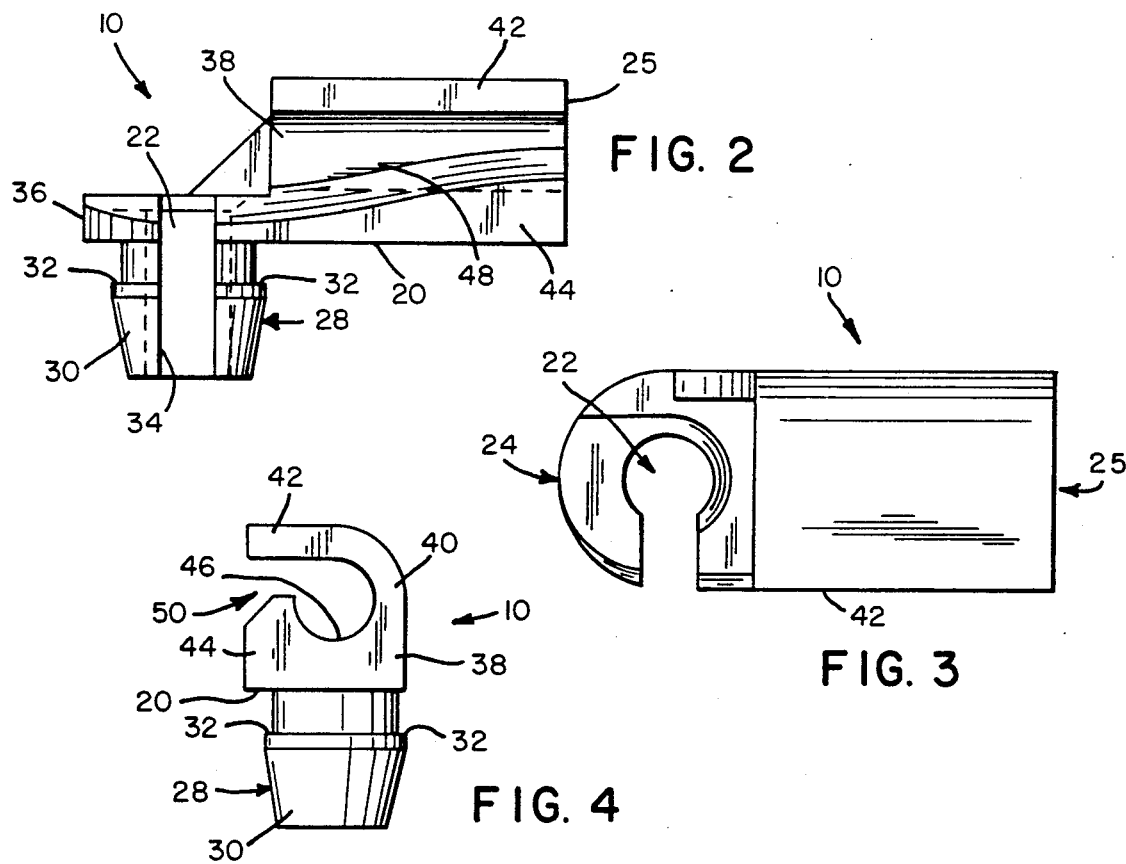

ROD END CLIP

BACKGROUND OF THE INVENTION

1. Field of the Invention

This invention relates generally to rod retaining devices and more particularly, it relates to an improved rod end clip for retaining an actuating rod having a right angled end, in a connected state with respect to an apertured lever.

2. Description of the Prior Art

As is well known in the automotive industry, there have been used heretofore many rod retaining devices for connecting actuating rods, having right angled ends to apertured levers such as, for example, automotive door locking mechanisms and carburetor linkage arrangements. Tolerances in the prior art rod retaining devices are typically large so as to be highly susceptible to vibrations, which in turn results in an annoying rattling sound or noise due to the vibrating motion normally encountered within a moving automobile.

A prior art search directed to the subject matter of this application was conducted in the U.S. Patent and Trademark Office and revealed the following U.S. Pat. Nos.:

| | |
|---|---|
| 1,183,621 | 4,306,820 |
| 3,007,725 | 4,406,557 |
| 3,679,249 | 4,627,304 |
| 3,695,652 | 4,697,948 |
| 3,993,410 | |

In U.S. Pat. No. 3,679,249 to Donald R. Hoffmann issued on Jul. 25, 1977, there is disclosed a connecting device for coupling an elongated actuating rod, terminating in a short substantially right angled end portion, to an apertured lever member. The connecting device comprises an integrally molded plastic unit having a substantially flat rectangular base member with an actuating rod end portion receiving aperture defined within one end thereof. A substantially cylindrical retention means projects from one side of the base member and has a bore therethrough axially aligned with the base member aperture. The base member has upon its other side, opposite the cylindrical retention means side, and at its apertured end, an upstanding wall forming a socket open at the top and at one side thereof so as to receive the actuating rod end. A plurality of upstanding rod retention legs having lip portions are provided between which the actuating rod is received for snap-fit retention as its right angled end is inserted through the bore of the retention means.

In U.S. Pat. No. 3,993,410 to Ernest H. Lindsay, Jr. issued on Nov. 23, 1976, there is disclosed a one-piece plastic fastener for connecting a right angled actuating rod to a lever member. The fastener includes a base member having a rod receiving aperture at one end, a retaining means, and an upstanding wall. A rigid retaining arm is provided so as to overlie the base member in a spaced relationship with respect to the rod receiving aperture, and a resilient finger is disposed opposite to the extremity of the retaining arm and forms a throat with the arm so as to permit the insertion of the actuating rod into the retained position and beneath the arm when its right angled end is inserted through the aperture and into a bore of the retaining means.

In U.S. Pat. No. 4,306,820 to John F. Nelson issued on Dec. 22, 1981, there is taught a rod retainer for connecting an elongated actuating rod, terminating in a short right angled end portion, to an apertured lever. The retainer includes a base adapted to be secured to a work surface or lever. A first wall member upstanding from the base has its distal end terminating in a first latch means. A second wall member disposed opposite the first wall member is hingedly connected to a pivotal member whose distal end terminates in a second latch means. The first and second latch means are adapted to lockingly engage each other so as to securely retain the rod between the first wall member and the inner surface of the pivotal member. The remaining patents uncovered from the search but not specifically discussed merely show the state of the art relating to rod coupling devices and are thus considered to be only of general interest.

It is noted that none of the prior art uncovered in the search disclosed a rod and clip for retaining an elongated L-shaped actuating rod, terminating in a short substantially right angled end portion, to an apertured lever member like that of the present invention which includes a rear wall section upstanding from a base member and having its distal end terminating in an overlying arm portion, and a rigid retaining wall member upstanding from the base member and disposed substantially directly opposite the rear wall section so as to form a retaining groove therebetween for securely retaining the long leg of the actuating rod therein against rotational and vertical movement. Furthermore, the retaining wall member is provided with a cam surface which permits the insertion of the long leg of the actuating rod into the retaining groove with a low insertion force.

OBJECTS OF THE INVENTION

Accordingly, it is a general object of the present invention to provide an improved rod end clip for retaining an actuating rod, having a right angled end, connected to an apertured lever member which is relatively simple and economical to manufacture and assemble.

It is an object of the present invention to provide an improved rod end clip which is formed of a one-piece molded construction.

It is another object of the present invention t provide an improved rod end clip which has a high removal force, which is characteristic of the removal of the actuating rod from the retaining groove, that is many times greater than the low insertion force of the rod into the retaining groove.

It is still another object of the present invention to provide an improved rod end clip which includes a rigid retaining wall member having a cam surface which permits the insertion of the long leg of an actuating rod into a retaining groove with a low insertion force.

It is yet still another object of the present invention to provide an improved rod end clip which includes a rear wall section which is upstanding from a base member and which has its distal end terminating in an overlying arm portion which is maintained in contact engagement with the long leg of an actuating rod so as to eliminate any rattling noise due to vibrations.

SUMMARY OF THE INVENTION

In accordance with these aims and objectives, the present invention is concerned with the provision of an improved rod end clip for retaining an elongated L- shaped actuating rod, terminating in a short substantially right angled end portion in a connected state with respect to an apertured lever member, which includes a substantially rectangular flat base member having an actuating rod end receiving aperture disposed at its one end. Substantially cylindrical retaining means projects from one side of the base member and has a bore therethrough axially aligned with the base member receiving aperture. An upstanding wall projects from the other side of the base member at its apertured end so a to form a socket open at the top and at one side thereof so as to receive the short end portion of the actuating rod. A rear wall section upstanding from the base member is provided at it distal end with an overlying arm portion. A rigid retaining wall member upstanding from the base member and disposed substantially directly opposite the rear wall section is provided so as to form a retaining groove therebetween for securely retaining the long leg of the actuating rod therein against rotational and vertical movement. The retaining wall member has a cam surface which permits the insertion of the long leg of the rod into the retaining groove with a low insertion force.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, and wherein:

FIG. 1 is a perspective view of a fragmentary portion of an actuating rod coupled to a rod end clip, constructed in accordance with the principles of the present invention;

FIG. 2 is a side elevational view of the rod end clip of FIG. 1;

FIG. 3 is a top plan view of the rod end clip of FIG. 2;

FIG. 4 is an end view of the rod end clip of FIG. 2;

DESCRIPTION OF THE PREFERRED EMBODIMENT

Figure 5:
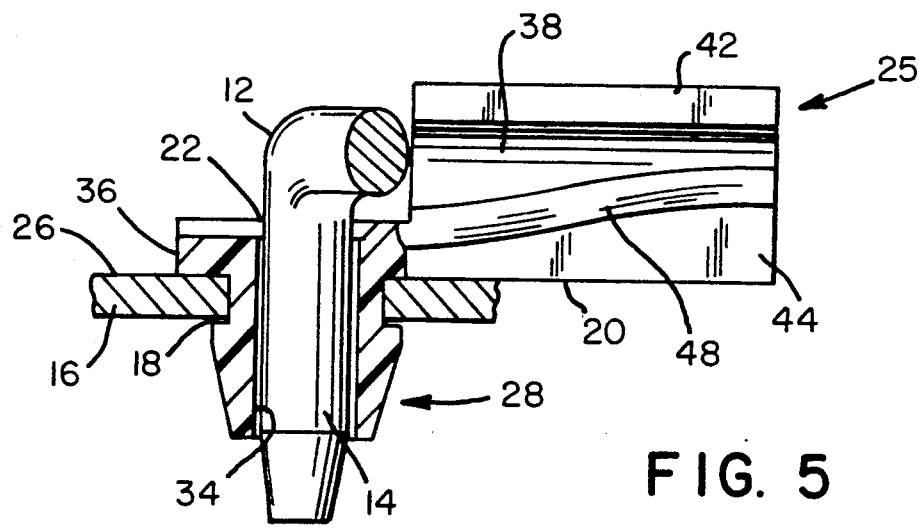
FIG. 5 is a side elevational view, partly in cross-section, of the rod end clip assembled to an apertured lever member with the actuating rod disposed in its initially inserted position.

Referring now in detail to the various views of the drawings, there is illustrated a rod end clip 10 which is constructed in accordance with the principles of the present invention. The rod end clip 10 is preferably formed as a one-piece thermoplastic molded product which can be fabricated from nylon or other similar materials with the capacity of being rigid when formed in heavy sections and resilient when formed in thinner sections. The rod end clip functions to retain an elongated L-shaped actuating rod 12 (FIG. 1) having a short substantially right angled end portion or leg 14 in a connected state with respect to a lever member 16 having an aperture 18 defined therethrough. The rod end clip may be utilized in any environment in which it is desired to connect an actuating rod to an apertured lever member, such as, for example, automotive door locking mechanisms, carburetor linkage arrangements, and the like.

The rod end clip 10 has a substantially rectangular flat base member 20 with an actuating rod end portion receiving aperture 22 at one end 24, as can best be seen from FIGS. 2-4. The end 24 may be round as can be seen from FIGS. 1 and 3. The underside of the flat base member 20 is adapted to abut the upper surface 26 of the lever member 16. A substantially cylindrical retaining means 28 is formed integrally with the underside of the base member 20 for acceptance within the aperture 18 of the lever member 16.

The retaining means 28 includes a tapered nose portion 30 so as to facilitate its insertion into the aperture 18 and shoulder means 32 disposed so as to engage the underside of the lever member 16. The retaining means 28 also has a bore 3 therethrough which is axially aligned and is equal in diameter to the receiving aperture 22 defined within the base member 20. As will be noted, the tapered nose section 30 will be compressed as it is inserted into the aperture 18 of the lever member 16 until the shoulder means 32 passes through the aperture 18 and will then resiliently expand into a locked assembly therewith.

The base member further includes an upstanding wall 36 disposed upon the upper or opposite side of the base member 20 and which forms a pocket or socket which is open at the top and at one side thereof. Extending the length of the base member 20 is a first wall or rear wall section 38 which has a distal end 40 terminating in a horizontally extending, overlying arm portion 42. Also projecting from the base member 20 and substantially directly opposite the rear wall section 38 is a second wall 44 defining a rigid upstanding retaining wall member. The rigid retaining wall member 44 is arcuate in formation and is configured so as to form with the rear wall section 38 a retaining groove 46 therebetween. The retaining groove 46 is contoured in general in correspondence to the transverse dimension of the actuating rod 12.

There is a space or gap 50 formed between the underneath side of the overlying arm 42 and the top side of the retaining wall member 44. The space 50 is less than the thickness of the long leg 15 of the actuating rod 12. Thus, the long leg 15 of the actuating rod 12 must be forced through this space 50. In order to facilitate such insertion with a low insertion force, the front section of the rigid retaining wall member 44 is provided with a gradually upwardly sloping or cam surface 48. The cam surface 48 tapers from the one end 24 to the other end 25.

The assembly of the actuating rod 12 to the lever member 16 is achieved through the medium of the rod end clip 10. The tapered nose section 30 of the retaining means 28 is first inserted through the aperture 18 of the lever member 16 in a manner previously described. Once the rod end clip 10 is secured within the lever member 16, the short end portion or leg 14 of the actuating rod 12 is then inserted into the receiving aperture 22 which guides the end portion 14 into the bore 34, as is illustrated in FIG. 5.

Figure 6:
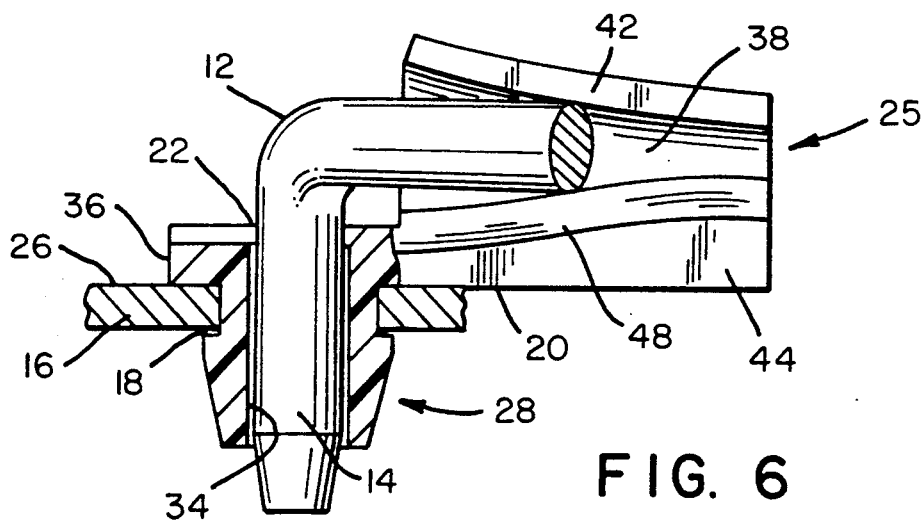
FIG. 6 is a view similar to that of FIG. 5, but showing the actuating rod in a second position during the insertion procedure.

Next, the long leg 15 of the actuating rod is rotated so that it is forced into the space 50. Upon partial insertion of the long leg 15 of the rod 12 into the space 50, there is developed an angled force upon the rod 12 due to the cam surface 48 formed upon the rigid retaining wall member 44 which translates the same into a vertical force upon the overlying arm 42. The cam surface 48 provides a mechanical advantage so as to move the rod 12 upwardly and thereby and causes the overlying arm 42 to resiliently yield or flex upwardly and permit the passage of the long leg 15 of the rod 12 through the space 50, as is illustrated in FIG. 6.

Continued rotation of the long leg 15 of the actuating rod 12 will cause it to ride completely up the cam surface 48, through the space 50, over the rigid retaining member 44, and down into the retaining groove 46 which is the final lock-down position of the actuating rod 12. It will be noted that as soon as the widest part of the long leg 15 of the actuating rod 12 passes between the space 50, the overlying arm 42 will flex back to its original position since it is formed from a thinner plastic material. As a result, the long leg 15 can be inserted into the retaining groove 46 with a low insertion force.

Figure 7:
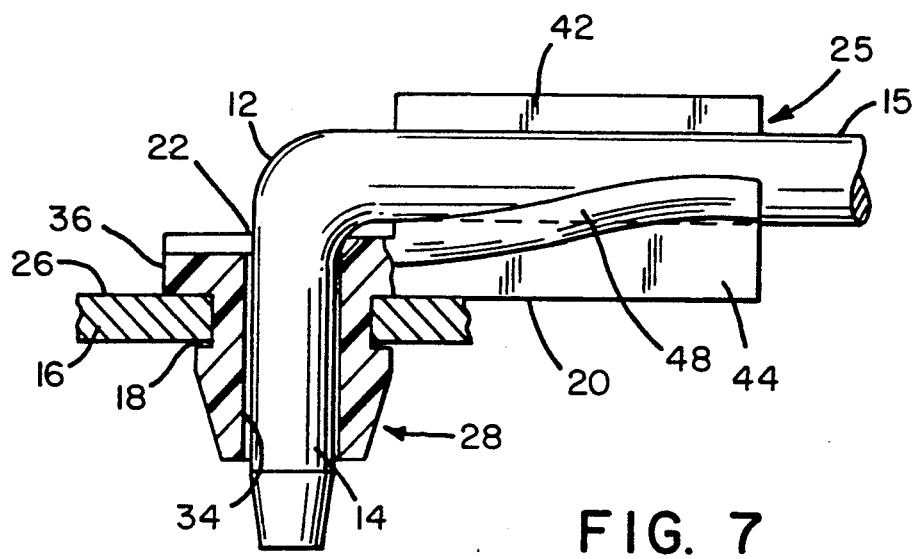
FIG. 7 is a view similar to that of FIG. 6, but showing the actuating rod in a final retained position.

In this final position as illustrated in FIG. 7, the long leg 15 of the actuating rod 12 is maintained secured within the retaining groove 46 by means of overlying arm 42. The overlying arm 42 also serves to eliminate any annoying sound or noise due to vibration since it is maintained in continuous contact engagement with the long leg 15 of the rod 12. Consequently, the rod 12 is securely restrained from undergoing any rotational and vertical movement due to the over-center condition produced by means of the rigid retaining wall member 44 with no readily accessible way out of the retaining groove 46. Therefore, the removal force required to remove the long leg 15 of the actuating rod 12 from the retaining groove 46 is many times greater than the low insertion force of the long leg 15 of the rod 12 into the retaining groove 46.

From the foregoing detailed description, it can thus be seen that the present invention provides an improved rod end clip which includes a rear wall section upstanding from a base member and having its distal end terminating in an overlying arm portion. A rigid retaining wall member upstanding from the base member and disposed substantially directly opposite the rear wall section is provided so as to form a retaining groove therebetween for securely retaining the long leg of the actuating rod therein against rotational and vertical movement. The retaining wall member has a cam surface which permits the insertion of the long leg of the actuating rod into the retaining groove with a low insertion force.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A rod end clip for retaining an elongated L-shaped rod, terminating in a short substantially right-angled end portion, therewithin, comprising:

a substantially flat base member having an aperture defined therewithin for receiving said short, substantially right-angled end portion of said L-shaped rod therewithin;

groove means defined within a surface portion of said substantially flat base member for receiving a long leg portion of said L-shaped rod;

an upstanding rear wall section disposed upon one side of said substantially flat base member and having a distal end portion thereof terminating in a flexibly resilient arm portion which overlies, and is spaced a predetermined distance from, said surface portion of said substantially flat base member within which said groove means is defined such that when said long leg portion of said L-shaped rod is seated within said rod end clip, said long leg portion of said L-shaped rod will be interposed between said groove means of said substantially flat base member and said flexibly resilient arm portion;

a rigid upstanding retaining wall member disposed upon another side of said substantially flat base member and opposite said upstanding rear wall section such that said groove means defined within said surface portion of said substantially flat base member is interposed between said rear wall section and said retaining wall member; and cam means defined upon said rigid upstanding retaining wall member for biasing said long leg portion of said L-shaped rod into contact with said flexibly resilient arm portion of said rear wall section so as to resiliently deform said flexibly resilient arm portion of said rear wall section in order to permit entry of said long leg portion of said L-shaped rod into said space, defined between said flexibly resilient arm portion of said rear wall section and said surface of said flat base member, and into said groove means, defined within said surface portion of said flat base member, with a low insertion force and in a snap-engagement manner whereby, when said long leg portion of said L-shaped rod is seated within said groove means of said flat base member, said long leg portion of said L-shaped rod will be retained within said rod end clip as a result of being confined between said flexibly resilient arm portion of said rear wall section cooperating with said flat base member, and between said upstanding rear wall section and said rigid upstanding retaining wall member.

2. A rod end clip as claimed in claim 1, wherein said long leg portion of said rod is circular in it transverse dimension, and wherein said receiving groove means is contoured in correspondence to the circular diameter of the long leg of said rod.

3. A rod end clip as claimed in claim 1, wherein the underneath side of the overlying arm and the top side of the rigid retaining wall member form said space therebetween which is less than the thickness of the long leg of said rod whereby the long leg of said rod must be forced through the space after said short end portion has been inserted into said aperture of said flat base member.

4. A rod end clip as claimed in claim 3, wherein said overlying arm portion is flexed upwardly as the long leg of said rod is forced through the space to permit passing of the long leg into the retaining groove.

5. A rod end clip as claimed in claim 1, wherein the overlying arm portion is maintained in contact engagement with the long leg of said rod so as to eliminate any annoying noise due to vibrations.

6. A rod end clip as claimed in claim 1, wherein said cam means tapers from adjacent the apertured end of the base member to its other end.

7. A rod end clip as claimed in claim 1, wherein said rod end clip is formed of a one-piece molded plastic material.

8. A rod end clip as set forth in claim 1, further comprising:
substantially cylindrical retaining means projecting substantially perpendicular to one surface of said flat base member and comprising bore means coaxially aligned with said aperture of said flat base member for housing said short, substantially right-angled end portion of said L-shaped rod.

9. A rod end clip as claimed in claim 8, wherein said cylindrical retaining means comprises a tapered nose section for facilitating its insertion into an aperture of a lever member and shoulder means for engaging the underside of the lever member.

10. A rod end clip as set forth in claim 9, wherein:
said rod end clip is formed as a one-piece, molded plastic component.

11. A rod end clip as set forth in claim 8, further comprising:
slot means defined within said flat base member and said cylindrical retaining means, and communicating with said aperture of said flat base member and said bore means of said cylindrical retaining means, for permitting said short, substantially right-angled end portion of said L-shaped rod to be inserted radially into said aperture and bore means of said flat base member and said cylindrical retaining means, respectively.

12. A rod end clip as set forth in claim 8, wherein:
said cylindrical retaining means comprises a tapered nose section for facilitating insertion thereof into an aperture formed within a panel member, and shoulder means for engaging opposite surfaces of said panel member in order to retain said cylindrical retaining means within said aperture of said panel member.

13. A rod end clip as set forth in claim 12, wherein:
said rod end clip is formed as a one-piece, molded plastic component.

14. A rod end clip as set forth in claim 1, further comprising:
slot means defined within said flat base member and communicating with said aperture of said flat base member for permitting said short, substantially right-angled end portion of said L-shaped rod to be inserted radially into said aperture of said flat base member.

15. A rod end clip for retaining an elongated L-shaped rod, terminating in a short substantially right-angled end portion, therewithin and for mounting said L-shaped rod upon a support member, comprising:
a substantially flat base member having an aperture defined therewithin for receiving said short, substantially right-angled end portion of said L-shaped rod therewithin;
groove means defined within a surface portion of said substantially flat base member for receiving a long leg portion of said L-shaped rod;
an upstanding rear wall section disposed upon one side of said substantially flat base member and having a distal end portion thereof terminating in a flexibly resilient arm portion which overlies, and is spaced a predetermined distance from, said surface portion of said substantially flat base member within which said groove means is defined such that when said long leg portion of said L-shaped rod is seated within said rod end clip, said long leg portion of said L-shaped rod will be interposed between said groove means of said substantially flat base member and said flexibly resilient arm portion of said upstanding rear wall section;
a rigid upstanding retaining wall member disposed upon another side of said substantially flat base member and opposite said upstanding rear wall section such that said groove means defined within said surface portion of said substantially flat base member is interposed between said rear wall section and said retaining wall member;
cam means defined upon said rigid upstanding retaining wall member for biasing said long leg portion of said L-shaped rod into contact with said flexibly resilient arm portion of said rear wall section so as to resiliently deform said flexibly resilient arm portion of said rear wall section in order to permit entry of said long leg portion of said l-shaped rod into said space, defined between said flexibly resilient arm portion of said rear wall section and said surface portion of said flat base member, and into said groove means, defined within said surface portion of said flat base member, with a low insertion force and in a snap-engagement manner whereby, when said long leg portion of said L-shaped rod is seated within said groove means of said flat base member, said long leg portion of said L-shaped rod will be retained within said rod end clip as a result of being confined between said flexibly resilient arm portion of said rear wall section cooperating with said flat base member, and between said upstanding rear wall section and said rigid upstanding retaining wall member; and
means disposed upon said flat base member for releasably engaging said support member so as to releasably mount said rod end clip, and said L-shaped rod retained within said rod end clip, upon said support member.

16. A rod end clip as set forth in claim 15, wherein:
said means for releasably engaging said support member is integral with, and projects away from, a first surface of said flat base member which is opposite a second surface of said flat base member with respect to which said upstanding rear wall section and said upstanding retaining wall member project away from.

17. A rod end clip as set forth in claim 16, wherein:
said rod end clip is formed as a one-piece, molded plastic component.

18. A rod end clip as set forth in claim 15, wherein:
said means for releasably engaging said support member comprises a tapered nose section for facilitating insertion thereof into an aperture formed within said support member, and shoulder means for engaging opposite surfaces of said support member in order to retain said means, for releasably engaging said support member, mounted within said aperture of said support member.

19. A rod end clip as set forth in claim 15, wherein:
said means for releasably engaging said support member comprises bore means, coaxially aligned with said aperture of said flat base member, for housing said short, substantially right-angled end portion of said L-shaped rod.

20. A rod end clip as set forth in claim 19, wherein said clip further comprises:

slot means defined within said flat base member and said means for releasably engaging said support member, and communicating with said aperture of said flat base member and said bore means of said means for releasably engaging said support member, for permitting said short, substantially right-angled end portion of said L-shaped rod to be inserted radially into said aperture and bore means of said flat base member and said means for releasably engaging said support member, respectively.

* * * * *